United States Patent [11] 3,624,682

[72] Inventor Leonard J. Kowal
 Prospect Heights, Ill.
[21] Appl. No. 823,008
[22] Filed May 8, 1969
[45] Patented Nov. 30, 1971
[73] Assignee I.T.E. Imperial Corporation

[54] TUBE CUTTER
 4 Claims, 5 Drawing Figs.
[52] U.S. Cl. ................................................ 30/102
[51] Int. Cl. .............................................. B26d 1/22
[50] Field of Search .......................... 30/94, 102, 125

[56] References Cited
 UNITED STATES PATENTS
 1,945,949 2/1934 Myers ........................... 30/102 X FOREIGN PATENTS
568,642 1/1959 Canada .................... 30/102

Primary Examiner—Andrew R. Juhasz
Assistant Examiner—Michael Koczo, Jr.
Attorney—Hofgren, Wegner, Allen, Stellman & McCord ABSTRACT: A tube cutter having a body defining a guide and a support portion. Rollers are provided on the support portion for supporting a tube to be cut. A holder is slidably mounted on the guide for movement toward and from the support portion and a cutting wheel is carried on the holder to bite into the tube supported on the support portion as a result of an advance of the holder toward the support portion. The holder is provided with a recess in which a second cutting wheel is provided. The cutting wheel is removably retained in the recess by means of a closure plate. The holder is moved on the guide by a threaded rod engaging a nut transversely adjustably positioned in a cavity in the holder.

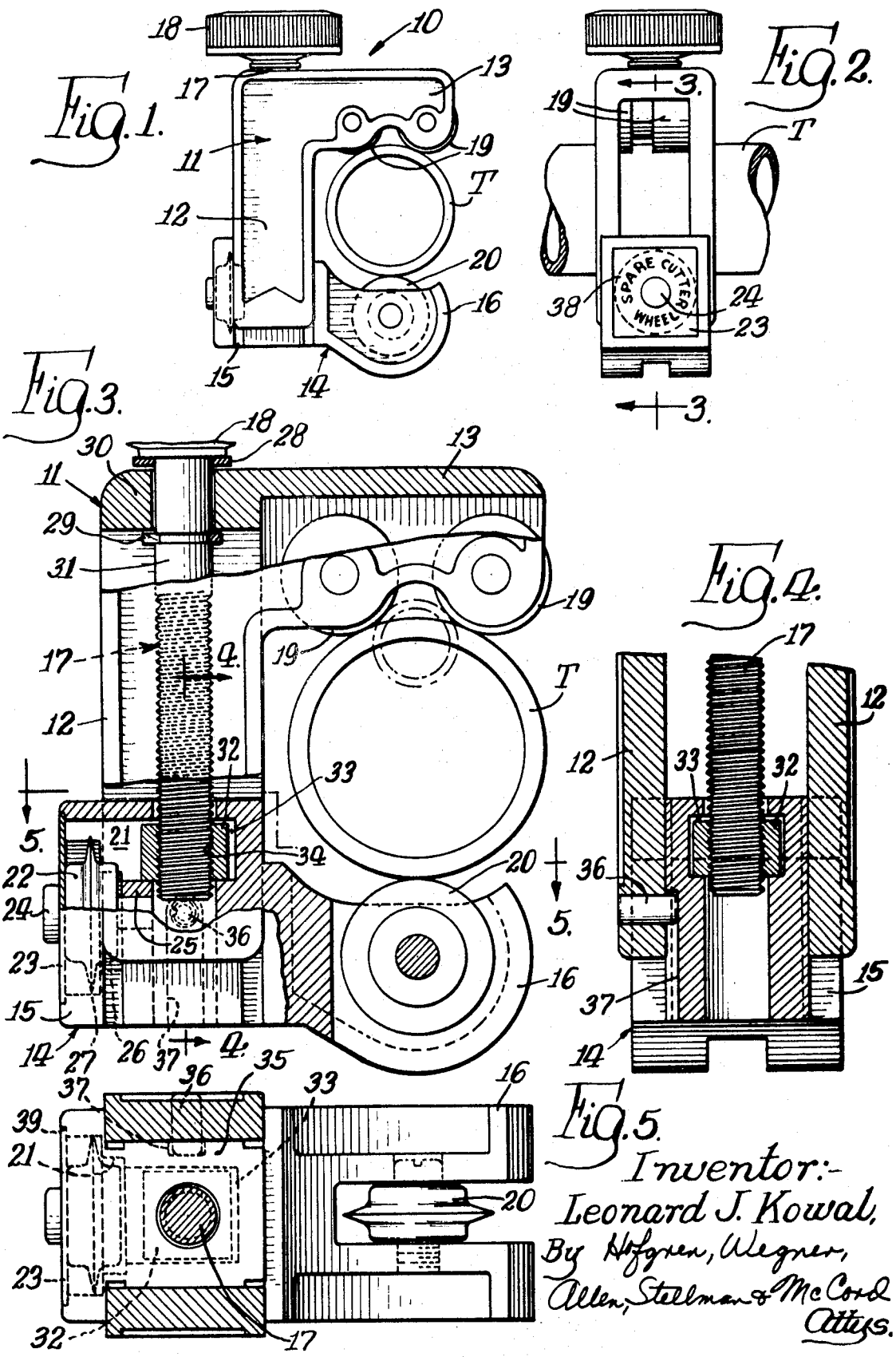

TUBE CUTTER

BACKGROUND OF THE INVENTION

1. Field of the Invention

This invention relates to tube cutters and in particular to hand-operated tube cutters wherein a cutting wheel is urged into the wall of the tube and swung about the axis of the tube to effect a cutting operation.

2. Description of the Prior Art

One improved form of hand-operated tube cutter is shown in the U.S. Pat. No. 3,135,050 issued to George Franck on June 2, 1964 covering a Manually Operable Tube Cutter With Movable Cutter Blade, and owned by the assignee hereof. In said patent, the cutting wheel is carried on a holder slidably movable on a guide portion of the body for selective engagement with a tube retained by a support provided on an upstanding portion of the body. A knob is provided for rotating a threaded rod which is engageable with a threaded bore in the base of the holder to effect the desired movement of the cutting wheel toward the tube.

SUMMARY OF THE INVENTION

The present invention comprehends an improved form of tube cutter generally of the type disclosed in said George Franck patent. The present invention comprehends such a tube cutter wherein the holder is provided with a base portion removably carrying a second cutting wheel. The second cutting wheel is received in a recess in the base portion and is retained therein by a plate and screw member extending through the plate and cutting wheel. The cutting wheel is retained by the screw to prevent damage to the cutting edge thereof. The dimensioning of the recess is correlated with the thickness of the cutting wheel whereby the cutting wheel is effectively retained in the recess by the plate and screw against movement therein.

The threaded rod engages a threaded female connector received within a cavity within the base portion of the holder. The female connector is transversely adjustable in the cavity to permit accurate alignment of the threaded bore thereof with the axis of the threaded rod. The female connector may comprise a nut and the cavity may define wall portions cooperating with the nut to retain the nut against rotation while permitting limited transverse adjustment thereof. The cavity opens to the recess receiving the second cutting wheel whereby the nut may be selectively replaced through the recess when desired.

BRIEF DESCRIPTION OF THE DRAWING

Other features and advantages of the invention will be apparent from the following description taken in connection with the accompanying drawing wherein:

FIG. 1 is a side elevation of a tube cutter embodying the invention arranged for cutting a tube;

FIG. 2 is a bottom view thereof;

FIG. 3 is an enlarged fragmentary section taken substantially along the line 3—3 of FIG. 2 with portions broken away to facilitate illustration of the invention;

FIG. 4 is a fragmentary section taken substantially along the line 4—4 of FIG. 3; and FIG. 5 is a section taken substantially along the line 5—5 of FIG. 3.

DESCRIPTION OF THE PREFERRED EMBODIMENT

In the exemplary embodiment of the invention as disclosed in the drawing, a tube cutter generally designated 10 is shown to comprise a hand-operated tube cutter having a body 11 defining a guide portion 12 and a support portion 13. A holder 14 is movably carried on the guide portion 12 and defines a base portion, or block, 15 and a cutting wheel mounting portion 16. As seen in FIG. 1, the holder 14 is movable toward and from the support portion 13 by means of a threaded male element, or rod, 17 provided at its outer end with a manually operable knob 18.

The support portion 13 is arranged to support the tube T to be cut and in the illustrated embodiment, is provided with a pair of axially spaced rollers 19. A cutting wheel 20 carried on the mounting portion 16 urges the tube T against the rollers 19, as shown in FIG. 1. As thusly arranged, the user merely swings the tube cutter 10 about the axis of the tube T whereby the cutting wheel 20 bites, or cuts, into the outer wall of the tube T a small amount during each revolution of the cutting tool. As the wheel bites into the wall, the holder 14 is advanced toward the support portion 13 by suitable manipulation of knob 18 whereby the cut in the tube wall is made progressively deeper until the tube is completely cut through.

As best seen in FIG. 3, the base portion 15 of holder 14 is provided with a recess 21 opening away from the mounting portion 16. The recess is adapted to receive a second cutting wheel 22 which may serve as a spare, or replacement, cutting wheel. Cutting wheel 22 is retained in recess 21 by a suitable closure plate 23 extending across the outer end of recess 21 and secured in place by means of a suitable screw 24 extending axially through the cutting wheel 22 and threaded into an inner portion 25 of the block 15. The depth of the recess 21 is made to correspond to the thickness of the cutting wheel hub portion 26 and, thus, the plate 23 and screw 24 effectively retain the cutting wheel 22 against movement in the recess 21. The cutting wheel edge 27 is thereby prevented from engaging portions of the holder 14 to preclude damage to the sharp cutting edge.

As indicated briefly above, movement of the block 15 on the guide 12 is effected by manipulation of the threaded rod 17 by means of knob 18. As shown in FIGS. 3-5, the threaded rod is axially fixed relative to body 11 by means of a pair of collars 28 and 29 at opposite sides of end wall 30 of the body adjacent support portion 13. The rod 17 is rotated about the longitudinal axis 31 thereof by suitable rotation of knob 18. A female connector 32 is associated with the cutting wheel holder 14 to be threadedly engaged by the rod 17 and resultingly effect the desired movement of the holder 14 toward and from support portion 13. As shown, the female connector 32 may comprise a nut adjustably positionable in a cavity 33 in the block 15. The nut is movable transversely to the axis of a threaded through bore 34 therein whereby bore 34 may be accurately coaxially aligned with the rod 17. As shown in FIG. 3, the width of the cavity 33 parallel to the axis of the nut bore 34 is similar to the thickness of the nut 32.

As shown in Fig. 5, the transverse dimensions of cavity 33 are slightly greater than the corresponding transverse dimensions of nut 32 to permit the desired transverse adjustment. However, the wall portions of the block defining the cavity 33 are spaced from the nut only a small distance thereby defining means for preventing rotation of the nut as the rod 17 is threaded relative to the nut. As shown in FIGS. 3 and 5, the cavity 33 opens to recess 21.

The block 15 is prevented from movement entirely away from the end of the guide 12 by a suitable stop pin 36 as shown in FIG. 4. The inner end of the stop pin is received in a suitable slot 37 in the block to limit the outward movement. In the event the user wishes to replace the nut 32, the stop pin 36 may be removed permitting the block to be withdrawn from the guide 12 and upon removal of the cutting wheel 22, removal and replacement of the nut 32 may be effected through the exposed recess 21.

As shown in FIG. 2, the closure plate 23 may be provided with a suitable indicium 38 indicating the location of the spare cutting wheel 22. As described above, the closure plate 23 serves the dual function of retaining the cutting wheel 22 and providing controlled access to the nut 32 for selective replacement when desired. As shown in FIG. 5, the plate 23 may be mounted flush with the block in a suitable recess 39 surrounding the opening to recess 21.

The foregoing disclosure of specific embodiments is illustrative of the broad inventive concepts comprehended by the invention.

I claim:

1. In a tube cutter having a body defining a guide, and an axially fixed male threaded element carried by the body for rotation about the longitudinal axis thereof, a block for carrying a tube-cutting element, said block being movably carried on said guide and having a cavity, and a female connector in said cavity and having a threaded through bore for engagement by said male threaded element, said female connector having a thickness parallel to the axis of said male element substantially equal to the corresponding dimension of said cavity and a transverse size less than the corresponding dimension of said cavity whereby said female connector is adjustably positioned in said cavity transversely to said male element axis for accurate coaxial alignment of said threaded bore thereof with said male element, the walls of said block defining said cavity further defining means for holding said female connector against rotation about the axis of said threaded bore whereby rotation of said male element about the axis thereof effects corresponding movement of said female connector and block axially of said male element.

2. The tube cutter structure of claim 1 wherein said female connector comprises a nut element.

3. The tube cutter structure of claim 1 further including means for limiting the movement of said block to preclude disengagement of said male element from said female connector.

4. The tube cutter structure of claim 1 further including means removably retaining said female connector in said recess permitting replacement thereof when desired.

* * * * *